(12) United States Patent
Mousseau

(10) Patent No.: US 12,229,874 B1
(45) Date of Patent: Feb. 18, 2025

(54) DYNAMIC OCCLUSION FOR AUGMENTED REALITY INTERFACE

(71) Applicant: A9.com, Inc., Palo Alto, CA (US)

(72) Inventor: Jack Mousseau, Palo Alto, CA (US)

(73) Assignee: A9.COM, INC., Palo Alto, CA (US)

( * ) Notice: Subject to any disclaimer, the term of this patent is extended or adjusted under 35 U.S.C. 154(b) by 310 days.

(21) Appl. No.: 17/991,544

(22) Filed: Nov. 21, 2022

(51) Int. Cl.
 *G06T 15/10* (2011.01)
 *G06T 7/50* (2017.01)
 *G06T 7/73* (2017.01)
 *G06T 19/00* (2011.01)
(52) U.S. Cl.
 CPC ............... *G06T 15/10* (2013.01); *G06T 7/50* (2017.01); *G06T 7/73* (2017.01); *G06T 19/006* (2013.01); *G06T 2207/10028* (2013.01)
(58) Field of Classification Search
 None
 See application file for complete search history.

(56) References Cited

U.S. PATENT DOCUMENTS

2022/0300001 A1\* 9/2022 Gayaka .................. G10L 15/08
2022/0326527 A1\* 10/2022 Taylor ..................... G06F 3/012

\* cited by examiner

*Primary Examiner* — Yi Wang
(74) *Attorney, Agent, or Firm* — K&L Gates LLP

(57) ABSTRACT

Devices and techniques are described for dynamically disabling occlusion in augmented reality. Point cloud data representing a physical 3D environment may be generated. An occupancy grid including a plurality of cells representing the 3D physical environment may be generated including first occupancy data for a first cell of the occupancy grid. The first occupancy data may indicate that the first cell is occupied based on a point of the point cloud data being present in the first cell. First data representing a placement of a first 3D virtual object may be received, the placement corresponding to a first set of the plurality of cells. A first number of the first set of the plurality of cells with occupancy data indicating occupancy may be determined. The first 3D virtual object may be rendered on a display of the mobile device in front of any physical objects in the 3D physical environment.

20 Claims, 13 Drawing Sheets

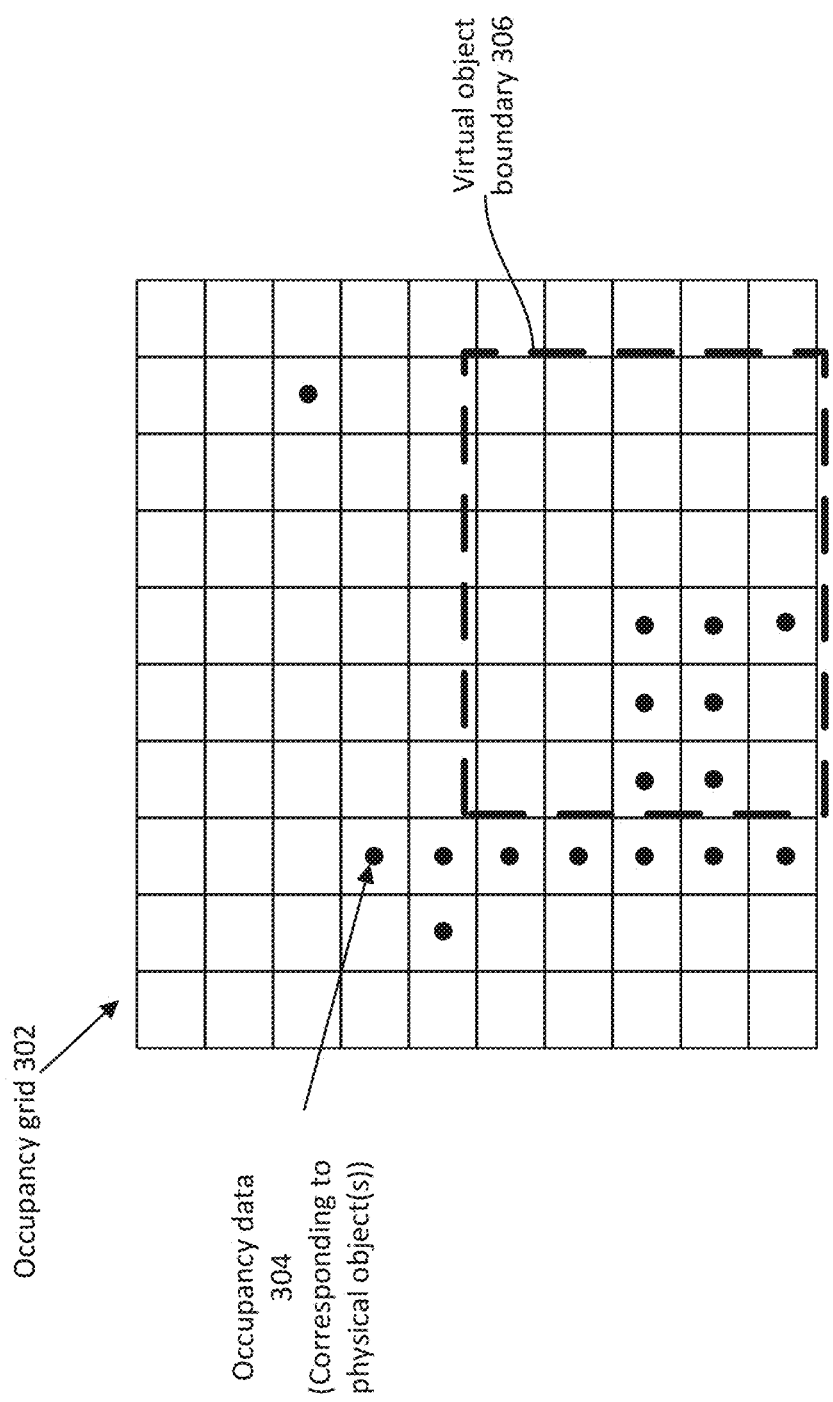

DYNAMIC OCCLUSION FOR AUGMENTED REALITY INTERFACE

BACKGROUND

Augmented and mixed reality systems combine the real, physical world with virtual objects displayed in a display that depicts both real-word objects in the physical environment and graphical representations of virtual objects as though the virtual objects are part of the physical environment. Virtual information can be constructive, in which the virtual objects add to the physical environment (e.g., adding text describing nutritional information to a plate of food) or destructive, in which the virtual objects mask some part of the physical environment. Augmented reality alters an on-going perception of the real world and, as such, is considered to be an immersive aspect of the physical environment.

BRIEF DESCRIPTION OF DRAWINGS

FIG. 3A depicts a two-dimensional representation of an intersection between a virtual object and an occupancy grid, in accordance with various aspects of the present disclosure.

DETAILED DESCRIPTION

Figure 1:
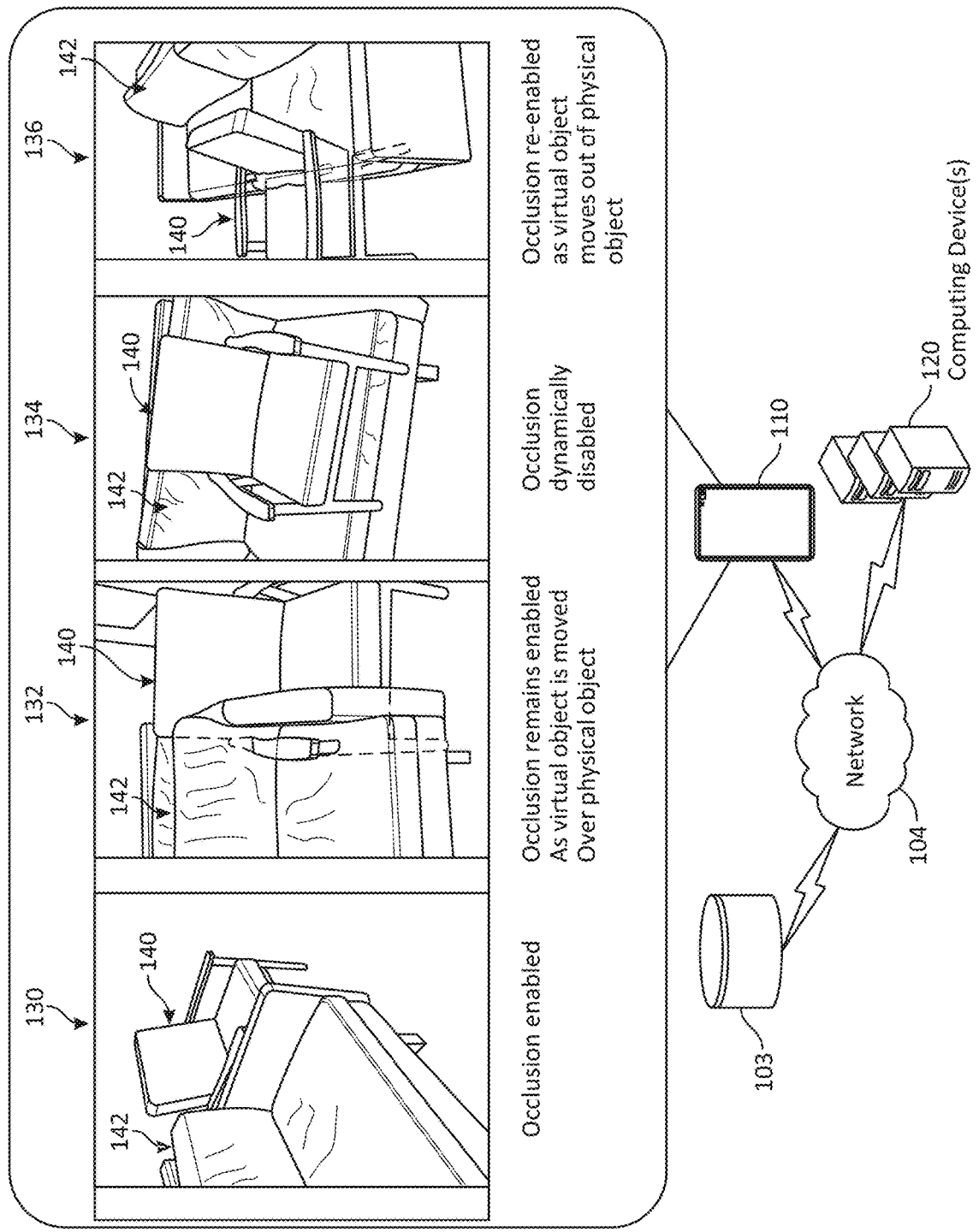
FIG. 1 depicts example augmented reality images in which occlusion is enabled and is dynamically disabled in accordance with various aspects of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Augmented reality interfaces display portions of the physical environment (e.g., the "real world") together with virtual objects (e.g., graphics, text, etc.) such that reality is augmented with the virtual objects. In augmented reality interfaces, virtual objects may be displayed in an opaque fashion such that they overlay and replace portions of the physical world. This may be desired in some instances. For example, an augmented reality skin may be used to change the print on a person's shirt to a different print. Accordingly, the desired print may be a virtual skin that is displayed overlaying the real-world print on a given person's shirt so that the virtual print, in effect, replaces the real-world print on the augmented reality display. Augmented reality typically refers to interfaces in which virtual and real world objects are displayed together on a display and in which the real world objects were captured using one or more cameras prior to rendering the real world objects on the display. Mixed reality, on the other hand, typically refers to interfaces including a display that is at least partially transparent. In mixed reality interfaces the user is able to directly perceive real world objects through the transparent display (as when a user wears glasses), while virtual objects may be rendered on the display and may, in some cases, occlude real world objects. Although augmented reality is typically referred to herein, the systems and techniques described herein may be equally applicable to augmented and mixed reality systems and interfaces. Accordingly, the term "augmented reality" is hereinafter used to refer to augmented reality systems and interfaces or mixed reality systems and interfaces, or in some cases, combinations of the two systems/interfaces.

However, in other cases, it may be advantageous to display virtual objects as being occluded by real world objects. For example, if a virtual building is to be displayed at a location that is behind a real-world fence, it may be desired to display the fence occluding a portion of the virtual building so that the building appears behind the fence in a natural-looking way. In various examples described herein, real world objects may be referred to as "physical objects." Physical objects are distinguishable from virtual objects, which are image data that are rendered on a display, but which otherwise have no real world component, outside the augmented reality space (e.g., a three dimensional environment that includes both physical and virtual objects displayed together).

In some examples described herein, the intent of a user in positioning a virtual object in an augmented reality space may be used to decide whether to occlude the virtual object with the physical object or to disable occlusion such that the virtual object is rendered over (e.g., in front of) the physical object. Consider an example where a user is considering buying a new chair. The user may use an augmented reality interface to place a virtual object (a virtual object that depicts the chair of interest) within the room in which the user is considering placing the chair. Accordingly, the user may position the virtual chair in the room and may move the virtual chair to different locations in order to get a sense of how the chair will look in the room (e.g., whether the chair is visually complementary to the room including other physical objects in the room). If the user positions the virtual chair next to a sofa (a physical sofa in the room), it may be inferred that the user's intent is to place the chair next to the sofa, but not to replace the sofa with the chair. Accordingly, in this case, it may be advantageous to enable occlusion such that, when viewed from certain angles, the sofa occludes portions of the chair, mimicking the view that a person would expect if the actual chair were present in the room next to and at least partially behind the sofa. Conversely, if the user positions the virtual chair directly within the center of the physical sofa, it may be inferred that the user's intent is to replace the physical sofa with the chair. In this case, occlusion may be disabled such that the virtual chair appears in front of the physical sofa, thus assisting the user in visualizing how the chair would look in that space when replacing the sofa. Notably, if occlusion is not disabled in such a case, the physical sofa may occlude the chair preventing the user from visualizing the chair in the same position as the sofa.

Described herein are various systems and techniques that may be used to dynamically enable and disable occlusion in an augmented reality interface based on the degree of overlap between physical objects in the space and virtual objects placed at different positions in the space. As used herein, "occlusion" and enabling occlusion refers to rendering physical objects in front of virtual objects on an augmented reality display, while disabling occlusion refers to rendering virtual objects in front of physical objects. However, it should be noted that occlusion could instead refer to rendering virtual objects in front of physical objects. The various systems and techniques described herein are applicable to both scenarios; although for ease of description occlusion is typically used to refer to the case where the physical object occludes the virtual object.

Depth data may be available from depth sensors of mobile devices. For example, Lidar sensors, time-of-flight sensors, stereoscopic camera sensors, etc., may be used to provide depth data comprising sets of three dimensional (3D) coordinates describing surfaces and points on objects detected in the physical environment. The depth data may be used in conjunction with various techniques described herein to determine a location of physical objects in the augmented reality space. Thereafter, an intersection between a boundary representing a virtual object placed in the augmented reality space and data representing the physical objects of the augmented reality space may be evaluated to determine the degree to which the virtual object overlaps with one or more physical objects. If the virtual object overlaps with one or more physical objects by greater than a threshold amount occlusion may be disabled such that the virtual object may be rendered overlaying the physical object. Conversely, if the degree of overlap is below an applicable threshold, occlusion may be used whereby portions of the virtual object that are located in the augmented reality space behind the physical object (from the perspective of the camera/viewer) are occluded by the physical object. In various examples, two different thresholds may be used to prevent flicker (e.g., occlusion being rapidly enabled and disabled). These and other techniques are described in additional detail below in reference to the drawings. The various systems and techniques described herein are used to improve augmented reality displays in order to generate more realistic displays that coincide with user intent based on the relative placement of virtual objects with respect to physical objects in the augmented reality space.

FIG. 1 depicts example augmented reality images in which occlusion is enabled and is dynamically disabled in accordance with various aspects of the present disclosure. Computing device(s) 120 may include non-transitory computer-readable memory 103 and/or may be configured in communication with non-transitory computer-readable memory 103, such as over network 104. In various examples, network 104 may represent a local area network (LAN) and/or a wide area network (WAN) such as the internet. In various examples, non-transitory computer-readable memory 103 may store instructions that may be used to implement the augmented reality interface and/or the dynamic occlusion techniques described herein.

A mobile device 110 (e.g., a smart phone, tablet device, wearable device (e.g., including AR glasses, etc.) and/or any other mobile device including a camera and at least one processor) may include a light detection and ranging (Lidar) sensor, in addition to an image sensor configured to generate frames of RGB image data. A mobile application may execute on the mobile device 110. The mobile application may provide an augmented reality interface that is effective to display a real-world environment along with integrated virtual objects. The mobile application may employ the camera and the Lidar sensor of the mobile device and may provide a visualization of the user (using a live view of the camera feed). The visualization may guide the user through scanning a room or other physical environment in order to generate a model of the environment in the augmented reality space (e.g., so that virtual objects may be placed within the environment in a way that appears natural to the user). The particular visualizations of the mobile application and/or scanning guidance may vary from implementation to implementation.

Figure 2A:
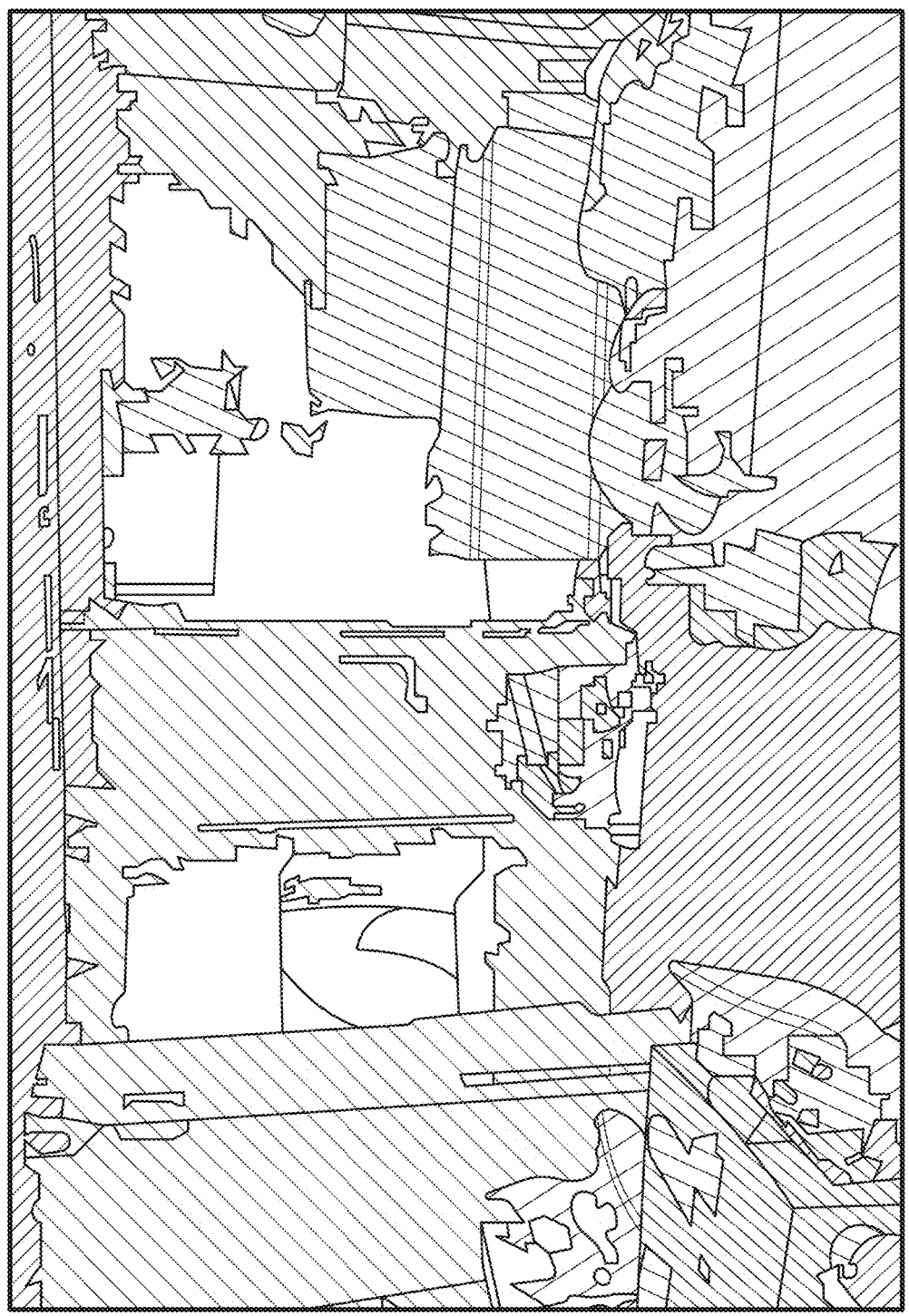
FIG. 2A depicts a representation of depth data that may be generated by a depth sensor and that may be used in the dynamic occlusion techniques described herein.

Depending on the particular mobile device 110, a camera and/or a depth sensor (e.g., a Lidar sensor) may generate depth map data. The depth map data may include distance information representing the distance between the camera (and/or other depth sensor) to the various surfaces of objects/structures in an image captured by the camera and/or depth sensor. For example, the depth map may be a frame of image data wherein each pixel is associated with a Z-value representing a distance between the surface represented by that pixel and the camera/depth sensor. Accordingly, in at least some examples, a depth map may be a frame of image data in which each pixel (or each pixel for which there is depth information) comprises R, G, B, and Z values. An example of a depth map image frame (e.g., depth data 150) is shown in FIG. 2A.

Figure 2B:
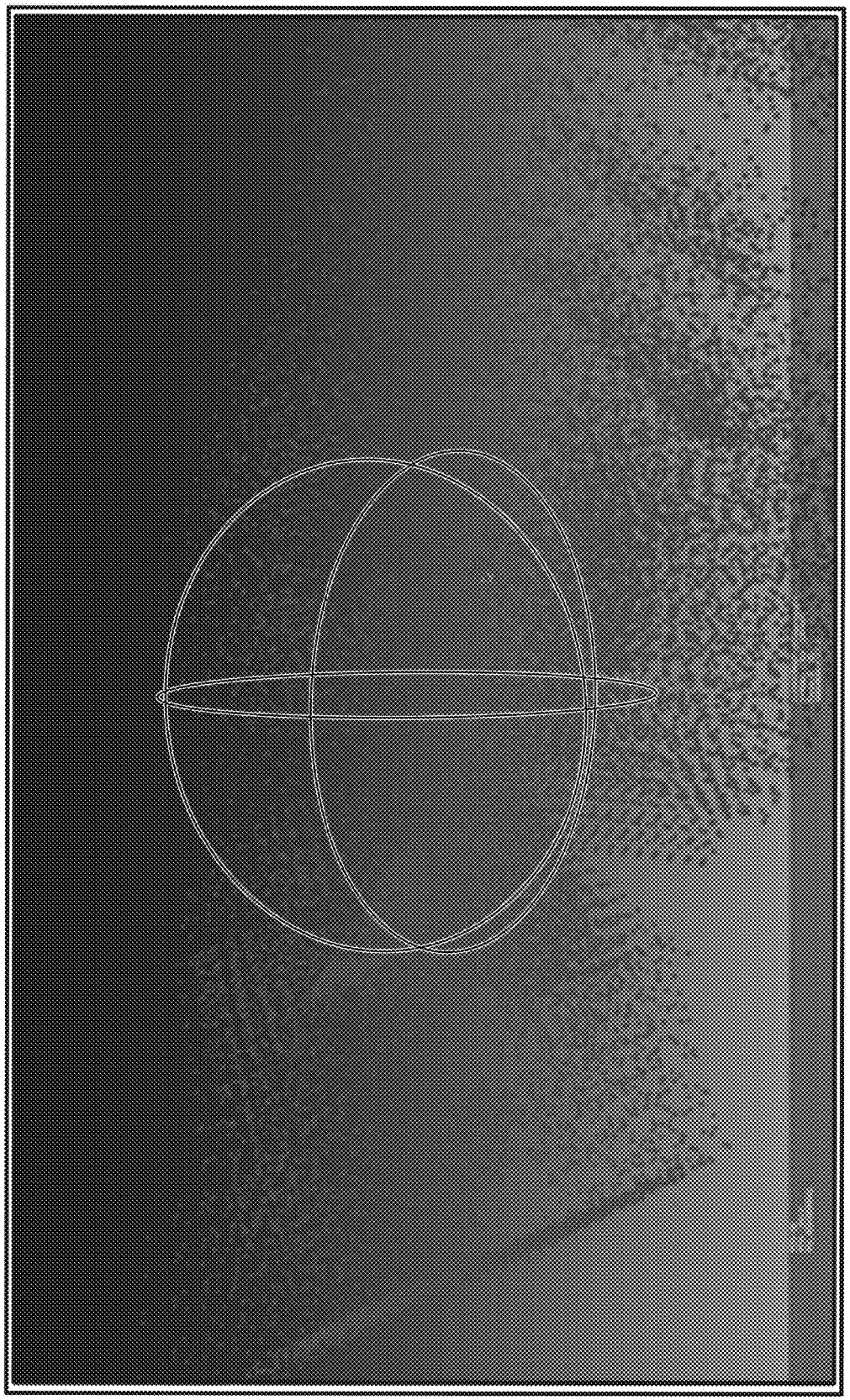
FIG. 2B depicts an example of point cloud data that may be generated from depth data and that may be used in accordance with various examples described herein.

The depth map data may be used to generate a point cloud (e.g., point cloud data), wherein each point in the point cloud includes 3D coordinates for that point (e.g., (X, Y, Z)). Depth map data (which may include depth values for each pixel) may be transformed into point cloud data using "unprojection" techniques. Typically, unprojection uses camera intrinsics (e.g., field-of-view information (e.g., in degrees), sensor size information (e.g., in millimeters) and camera extrinsics (e.g., position and rotation of the camera in 3D space) to determine 3D coordinates for the image pixels. The 3D points in the point cloud represent positions of objects/surfaces detected by the camera/depth sensor of mobile device 110. In some examples, the point cloud data may be converted into a mesh, however, in other examples, the points of the point cloud may be directly used for dynamic occlusion, as described in further detail below. An example of point cloud data is depicted in FIG. 2B (e.g., point cloud 152).

Figure 2C:
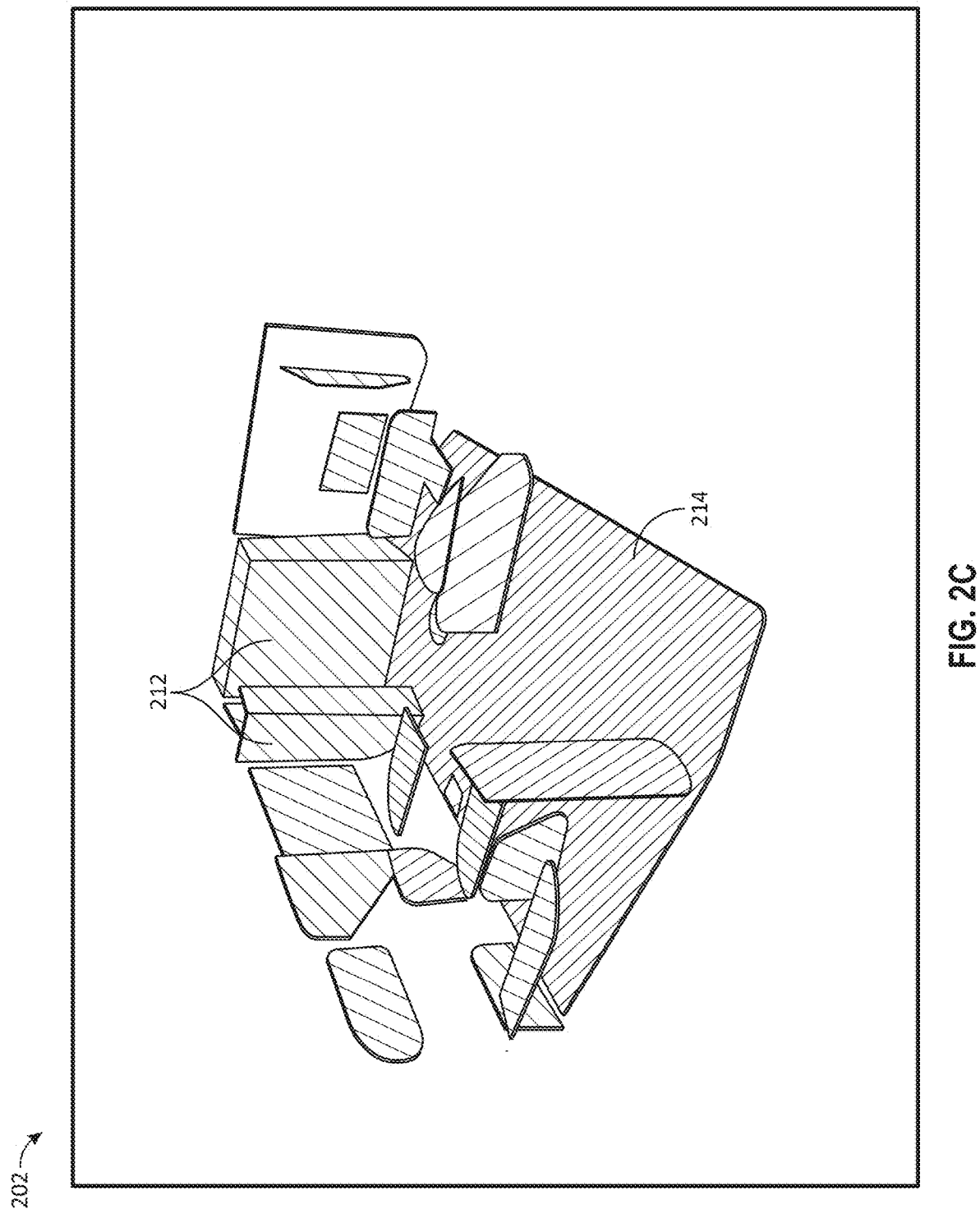
FIG. 2C depicts examples of plane data that may be used to discriminate between structural surfaces and objects present in a physical environment, in accordance with various aspects of the present disclosure.

As described in further detail below, the point cloud data may be filtered to distinguish between points corresponding to structural elements of the physical environment (e.g., walls, floors, ceilings, etc.) and points corresponding to non-structural objects (e.g., furniture). For example, plane data may be generated by the mobile device 110 (e.g., by an image processing component of the mobile device 110). For example, mobile device 110 may detect and classify various pixels in an input image as belonging to one or more planes (e.g., polygons) in the physical environment. The plane data generated by mobile device 110 may (e.g., plane data 202 depicted in FIG. 2C) may classify the location of such planes in the physical environment. Additionally, the plane data generated by mobile device 110 may classify the different planes as structural elements (e.g., wall, floor, ceiling, etc.). For example, in FIG. 2C, there may be wall planes 212, floor plane 214, etc.

Each point in the point cloud data may be assigned an "owning plane" which may be the nearest plane to that point. If a point is within a threshold distance (e.g., Euclidean distance) from a structural plane (e.g., a plane that is classified by plane data 202 as pertaining to a wall, ceiling, floor, or other predesignated structural plane), the point may be considered part of the structural plane and may be disregarded when generating the occupancy grid. Accordingly, non-structural points (e.g., points which are greater than the applicable threshold distance(s) from structural planes and/or points with owning planes that are non-structural (such as points with owning planes that are classified as furniture, etc.)) may be considered when generating the occupancy grid.

Figure 2D:
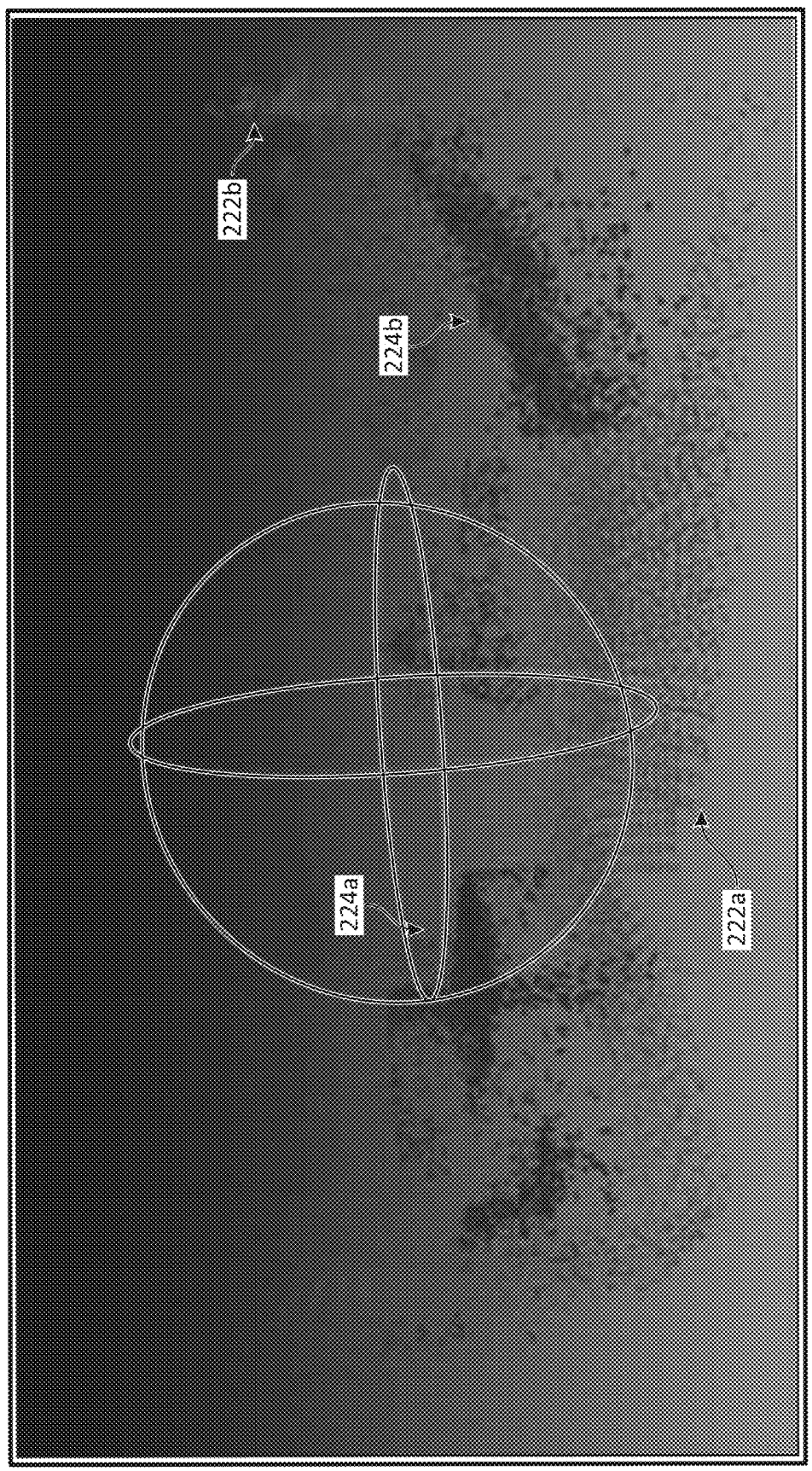
FIG. 2D depicts a refined point cloud in which various points have been classified as structural or non-structural points, in accordance with various aspects of the present disclosure.

FIG. 2D depicts a point cloud in which various points have been classified as either pertaining to a structural element or a non-structural element. For example, if a particular point of the point cloud is less than a threshold distance from the floor plane in the plane data 202 (FIG. 2C), the point may be classified as a structural point and thus may be disregarded when generating the occupancy grid. For example, the points 222a, 222b may be structural points. Points 222a may be associated with an owning plane that is classified as "floor" and may be within a threshold distance of that owning plane. Similarly, points 222b may be associated with an owning plane that is classified as "wall" and may be within a threshold distance of that owning plane.

Points 224a may be associated with a non-structural owning plane (e.g., points 224a may be associated with a chair). Note that some of the lower points in the point cloud that represent the chair may have the floor plane as an owning plane. However, since these points are greater than a threshold distance from the floor plane, these points are not classified as structural and may thus be considered in the occupancy grid. Similarly, points 224b may be associated with a non-structural owning plane (e.g., points 224b may be associated with a couch). In various examples, as a user continues to scan a room or other physical environment with an augmented reality enabled device (e.g., mobile device 110), the accuracy of the plane data 202 may be improved over time (as the camera generates more and more contextual data). This enables the plane data 202 to be more accurate in terms of detecting structural elements of the environment such as walls, floors, and ceilings. Accordingly, the point cloud data and the occupancy grid data may be updated over time as the plane data 202 is improved to provide more accurate occupancy grids. For example, a point in the point cloud data may initially be designated a structural point based on the distance between that point and a structural (e.g., floor) owning plane being less than a threshold distance. Points in the point cloud data and their designations may be stored in memory and updated over time. As the user continues to scan the room with the mobile device, the plane data may be updated (e.g., by device firmware). The points and their designations may be loaded from memory. In an example, the distance between the point and the structural owning plane may now exceed the threshold distance. Accordingly, the designation for the point may be changed from a structural point to a non-structural point. Since non-structural points may be considered when generating the occupancy grid, the cell of the occupancy grid corresponding to the non-structural point may be updated to be indicated as being occupied (if the cell was previously designated as being occupied). Similarly, non-structural points may be modified to be structural points based on updated plane information.

Figure 2E:
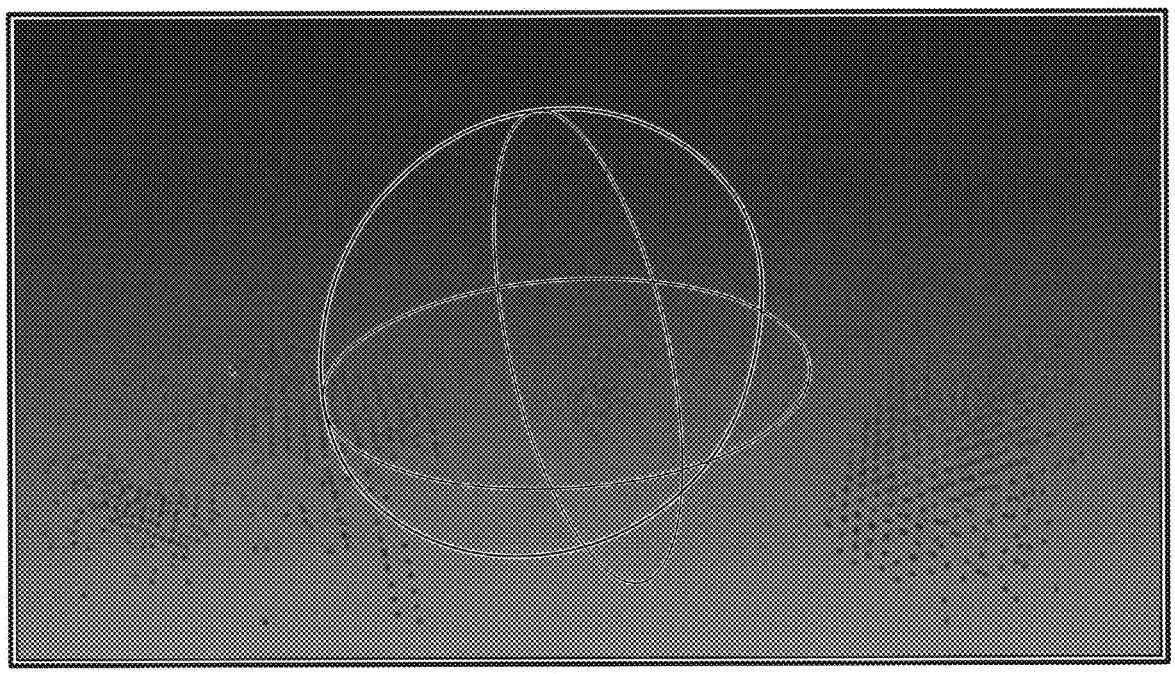
FIG. 2E depicts an example representation of an occupancy grid that may be used in accordance with various techniques described herein.

FIG. 2E depicts an example representation of an occupancy grid that may be used in accordance with various techniques described herein. After filtering the point cloud to distinguish between structural and non-structural points, as described above, the 3D space of the point cloud (e.g., the augmented reality space which represents the physical environment) may be conceptually separated into different 3D cells. In various examples, each 3D cell may be of an equal or approximately equal size. Thereafter, a determination may be made whether at least one non-structural point from the point cloud resides in a cell. If so, occupancy data is generated that indicates that the cell is occupied (e.g., occupied by some portion of a non-structural object). If not, occupancy data is generated that indicates that the cell is unoccupied (e.g., the cell is devoid of any portion of a non-structural object in the portion of the augmented reality space that corresponds to the cell). FIG. 2E depicts an example occupancy grid where each point represents a single cell of the occupancy grid that is occupied, while the remainder of the space is unoccupied.

Figure 2F:
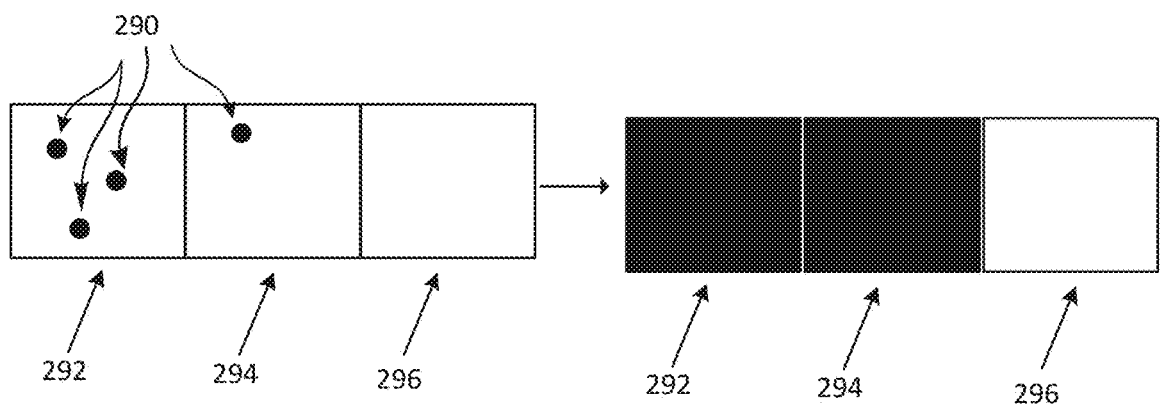
FIG. 2F depicts another example of generation of an occupancy grid that may be used in accordance with various techniques described herein.

FIG. 2F depicts another example of generation of an occupancy grid that may be used in accordance with various techniques described herein. The example in FIG. 2F shows point cloud data 290 with various points being located within grid cells of an occupancy grid that has been used to divide the 3D space (note that only a single dimension is shown in FIG. 2F for ease of illustration). Specifically, three points from the point cloud data 290 are located in occupancy grid cell 292 and a single point is located in occupancy grid cell 294. Accordingly, occupancy grid cells 292 and 294 are designated as being occupied (shown in FIG. 2F as filled black squares) while occupancy grid cell 296 is unoccupied (shown in FIG. 2F as a white square). It should be noted that while cubic cells (in 3D) may be used, the cells of the occupancy grid may be of any desired shape depending on the desired implementation.

The occupancy grid may represent the occupancy of the physical space with non-structural objects such as furniture, people, and other objects that do not form some part of the structure of the building or room, for example. As described in further detail below, occlusion may be dynamically disabled for an augmented reality interface when an overlap between a virtual object placed within the augmented reality space and one or more non-structural objects exceeds a relevant threshold overlap. The degree of overlap may be determined using the occupancy grid.

Returning to FIG. 1, an example of four images that may be part of an augmented reality display is shown. In these examples images, a virtual object (e.g., chair 140) has been placed at various different positions (e.g., by a user) within a physical environment that includes various physical objects (including couch 142).

In example image 130, the physical object (couch 142) occludes the virtual object (chair 140). In this example, the degree of overlap (e.g., the degree to which the virtual object (chair 140) and the physical object (couch 142) occupy the same 3D space) is minimal and is below a relevant threshold amount of overlap. As such, because the couch 142 is located in front of the virtual chair in the 3D augmented reality space, the couch 142 occludes the chair 140 and appears in front of it. This view imitates the scene as it would naturally appear to a user standing in the space at the same position as the camera if both the chair and couch were physical objects.

In example image 132, the user has begun to slide the virtual object (chair 140) into a position that partially overlaps with the physical object (couch 142) in the augmented reality space. In this example, occlusion remains enabled as the degree of overlap between the virtual object and the physical object has not yet reached the applicable threshold. As such, portions of the physical object (couch 142) that are between the camera and the virtual object (chair 140) are rendered in front of the chair 140. In some examples, a highlighted outline of the virtual object may be displayed as an overlay on the image so that the user can intuitively understand the position of the virtual object even when parts of the virtual object are hidden due to their occlusion by one or more physical objects (such as the couch 142).

In example image 134, the user has positioned the virtual object (chair 140) at a position at which there is a large degree of overlap between the virtual object (chair 140) and the physical object (couch 142). In this example, the degree of overlap has reached and/or exceeded the applicable threshold. As such, occlusion is dynamically disabled, and the virtual object (chair 140) is rendered on top of (e.g., in front of) the physical object (couch 142). Put another way, the virtual object now occludes the physical object. From a user interface perspective, this may be desirable so that the user can envision how the room would appear if the chair 140 replaced the couch 142 at the relevant location in the physical environment. Otherwise, if occlusion remained enabled, the user would be unable to see the chair 140 as it would be occluded by the couch 142 at this position.

In example image 136, the user has begun to move the virtual object (chair 140) away from the physical object (couch 142). Once the degree of overlap falls below an applicable threshold (which may, in some cases, be different than the threshold used to disable occlusion), occlusion is re-enabled such that the physical object (couch 142) occludes the virtual object (chair 140), as shown. In some examples, the threshold degree of overlap for re-enabling occlusion may be lower than the threshold used to dynamically disable occlusion to prevent flicker between occlusion being enabled and disabled and to provide a more consistent user experience. In some examples, when occlusion is enabled, an outline of the virtual object may be displayed (even over occluded portions of the virtual object) so that the user can understand the position of the virtual object and recognize that portions of the virtual object are occluded by the real-world object. For example, in example image 132, the dashed portions of the virtual object (chair 140) may denote that these portions are occluded by the physical couch, while still showing the user where the dashed portions of the virtual chair are currently positioned. Similarly, in example image 136, the rear legs of the chair 140 are shown in dashed lines as these portions of the virtual chair 140 are occluded when occlusion is re-enabled.

As previously described, the occupancy grid generated using the depth data (e.g., depth data 150), point cloud data (e.g., point cloud 152), and/or plane data (e.g., plane data 202) may be used to determine a degree of overlap between a virtual object and one or more physical objects in the augmented reality space in order to dynamically disable and/or re-enable occlusion (as shown in the examples in FIG. 1). Various techniques for determining a degree of overlap are described in reference to FIGS. 3A-3C.

FIG. 3A depicts a two-dimensional representation of an intersection between a virtual object and an occupancy grid, in accordance with various aspects of the present disclosure. It should be noted, that although the occupancy grid 302 (including the occupancy data 304), the virtual object boundary 306, and the various calculations and determinations described may be performed in 3D, the example in FIG. 3A displays and describes 2D operations for ease of illustration and explanation.

The occupancy grid 302 may represent the physical space and occupancy data for each cell of the occupancy grid 302 may represent whether one or more non-structural objects (or portions thereof) are present in the corresponding position in the physical space. The occupancy grid 302 together with the virtual object boundary 306 (which represents a virtual object being placed in the space) may represent the augmented reality space. Although a rectangular bounding box is used to represent the virtual object boundary 306 in FIG. 3A, it should be noted that other shapes and/or boundary representations may instead by used. For example, a polygon mesh may be used to represent the virtual object boundary 306. Occupancy data 304 (represented by black dots within the occupancy grid 302) may represent cells of the occupancy grid 302 that are occupied by one or more physical objects (e.g., non-structural objects). For example, occupancy data 304 may represent a 2D profile of a chair. Note that there are some outlier black dots which may be noise in the occupancy grid or which may represent some other physical object or some other portion of the same physical objects. The sizes of cells in the occupancy grid may be tunable to control the granularity of the occupancy information.

In the example of FIG. 3A, the virtual object boundary 306 defines the spatial position of a virtual object within the augmented reality space. A degree of overlap may be determined between the virtual object and one or more physical objects by determining a number of the occupied cells of the occupancy grid 302 that are bounded by (or otherwise associated with) the virtual object boundary 306 relative to the total number of cells bounded by the virtual object boundary 306.

In the example depicted in FIG. 3A, the virtual object boundary 306 bounds (or is associated with) 30 cells of the occupancy grid 302 of which 7 cells are indicated as being occupied by a physical object (determined using occupancy data 304). As such, there is an overlap of 7/30 (or approximately 23%) between the virtual object (represented by virtual object boundary 306) and one or more non-structural objects in the augmented reality space. As previously noted, although this simple example is described in two dimensions, the actual implementation may use three dimensions to perform the calculations. In this example, the threshold for disabling occlusion may be 20%. Accordingly, since the degree of overlap has exceeded the relevant threshold, occlusion may be disabled and the portions of the virtual object that are between the camera and the physical object may be rendered on the augmented reality display in front of the physical object.

As the virtual object is moved within the augmented reality space, the degree of overlap with physical objects will change. When the degree of overlap falls below a low threshold (which may be different than the threshold used to dynamically disable occlusion) occlusion may be re-enabled such that portions of the physical object that are between the camera and the virtual object may be displayed in front of (and thus occlude) the virtual object. The threshold for re-enabling occlusion may be lower than the threshold for disabling occlusion to prevent flicker between the occluded and non-occluded states.

Figure 3B:
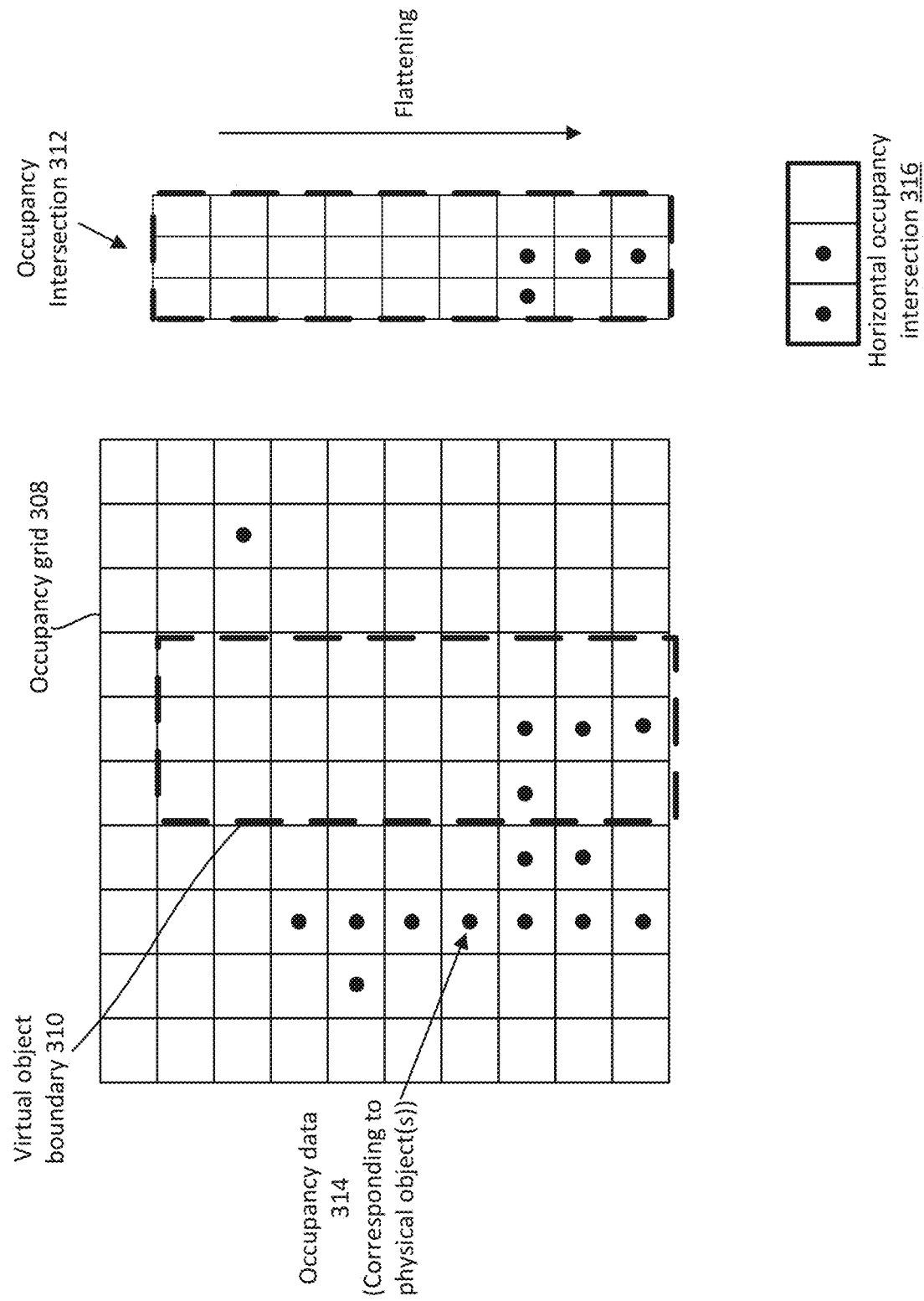
FIG. 3B depicts a two-dimensional example of a flattening operation that may be used to determine a horizontal occupancy of the intersection between a virtual object and an occupancy grid, in accordance with various aspects of the present disclosure.

In some examples, dynamically disabling occlusion based on three dimensional overlap may lead to undesirable user experiences. For example, consider a case where there is a physical couch that is relatively low to the ground and a virtual floor lamp that is relatively tall. FIG. 3B depicts a similar example. As shown, the virtual object boundary 310 (e.g., representing the virtual floor lamp) is relatively tall. By contrast, the couch (represented by the occupancy data 314 of occupancy grid 308) is relatively low along the vertical dimension. In this case, the degree of overlap in the occupancy intersection 312 (between the virtual floor lamp defined by virtual object boundary 310 and the couch represented by the occupancy data 314) is relatively small. In the example shown in FIG. 3B, there are 27 cells in the 2D occupancy intersection 312, of which only 4 cells are occupied for a degree of occupancy of 14.81%. This may be below the applicable threshold (e.g., a threshold percentage such as 20% or any other desired percentage) and thus occlusion may not be disabled for the augmented reality interface display. As such, the couch may be rendered in front of the lower portions of the virtual floor lamp such that the floor lamp appears to be protruding from the middle of the couch and extending vertically upward. However, in this case, the user may have positioned the virtual floor lamp near the center of mass of the physical couch as the user may be considering replacing the couch with a floor lamp and wants to see how it would look in the relevant space. Accordingly, the user may be frustrated that occlusion remains enabled on the augmented reality interface.

Figure 3C:
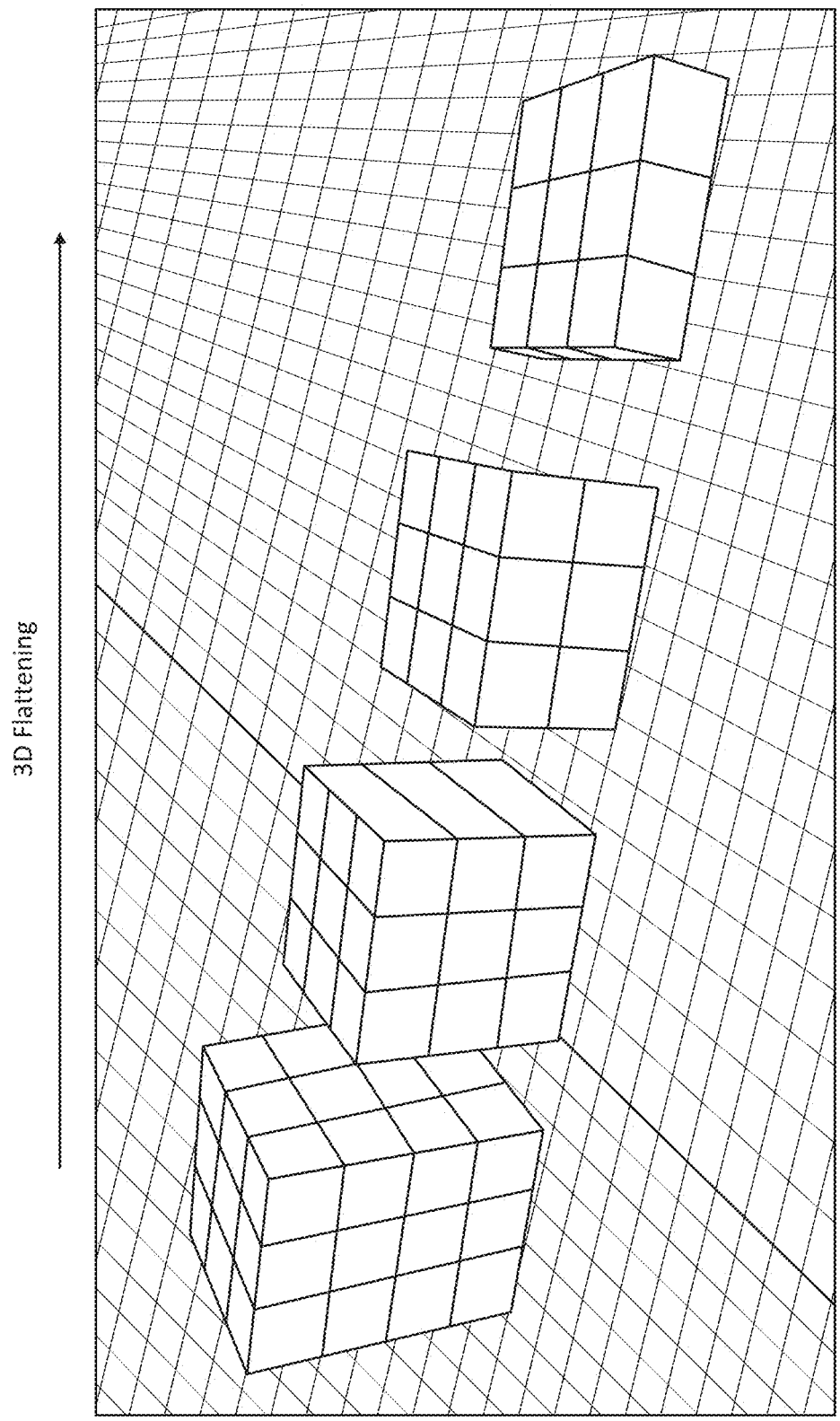
FIG. 3C depicts a three-dimensional example of a flattening operation that may be used to determine a horizontal occupancy of the intersection between a virtual object and an occupancy grid, in accordance with various aspects of the present disclosure.

Accordingly, in some examples, the occupancy intersection 312 may be flattened from a 3D volume (a 2D depiction of which is shown in FIG. 3B) to a 2D plane (e.g., a layer of cells in the x, z plane that is one cell in height along the y (vertical) dimension). Flattening involves collapsing each column of the 3D occupancy intersection into a column of height 1 (in other words, collapsing into a horizontal occupancy intersection 316, such that there is only one row). FIG. 3C depicts a three-dimensional example of a flattening operation that may be used to determine a horizontal occupancy (horizontal occupancy data) of the intersection between a virtual object and an occupancy grid.

If any column, in the 3D occupancy intersection includes occupancy data indicating that the column is occupied, the corresponding column of the horizontal occupancy intersection 316 includes occupancy data indicating that the cell/column is occupied. The percentage representing the degree of overlap of the horizontal occupancy intersection 316 may then be compared to the relevant threshold. In the example of FIG. 3B, the percentage of occupied to non-occupied cells in the occupancy intersection 312 (prior to flattening) is 4/27 (14.81%), while the percentage of occupied to non-occupied cells in the horizontal occupancy intersection 316 (post flattening) is 2/3=66.67%. Accordingly, the horizontal dimension of the occupancy grid is used to determine whether to disable occlusion. In some examples, a combination of the 3D occupancy intersection (e.g., occupancy intersection 312) and the horizontal occupancy intersection (e.g., horizontal occupancy intersection 316) may be used to determine whether to dynamically disable occlusion. The logic of combining these two metrics for determining whether to disable/re-enable occlusion may vary from implementation to implementation.

Figure 4:
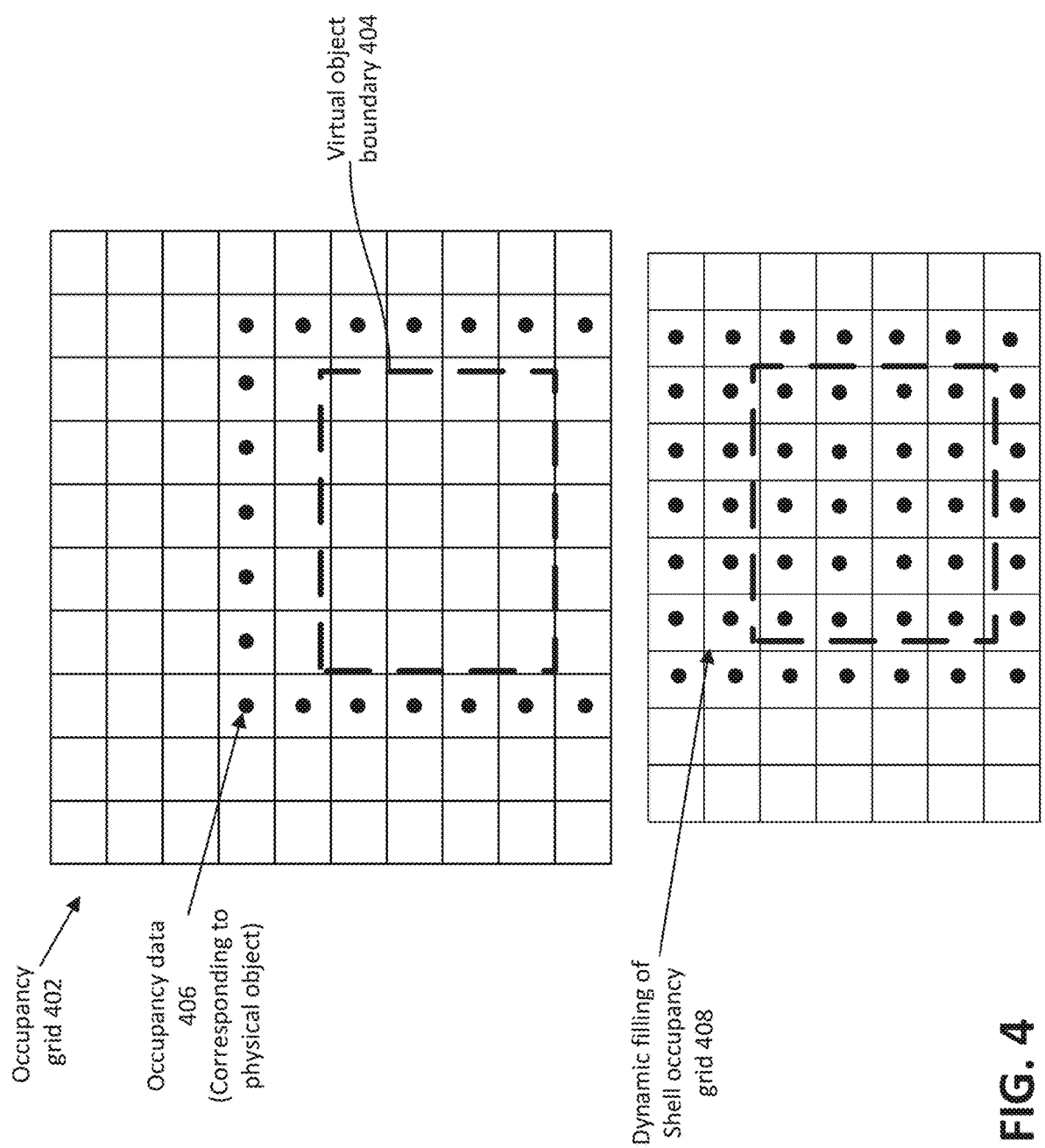
FIG. 4 depicts an example of a dynamic filling operation for an occupancy grid that may be used in accordance with various aspects of the present disclosure.

FIG. 4 depicts an example of a dynamic filling operation for an occupancy grid that may be used in accordance with various aspects of the present disclosure. In various examples, the occupancy grid (e.g., occupancy grid 402) may represent a shell where objects represented therein are represented only as outer shells (e.g., outer boundaries) with empty interiors (based on the depth data received from the camera/depth sensor). Accordingly, if a virtual object is relatively small, the virtual object boundary (e.g., virtual object boundary 404) may fit within the empty volume of the occupancy grid. For example, in FIG. 4, the virtual object represented by virtual object boundary 404 may be positioned inside the physical object represented by occupancy data 406. As such, the intersection of the virtual object boundary 404 and the occupancy grid 402 (determined using occupancy data 406) has a 0% overlap as the interior of the objects represented by the occupancy data 406 is empty.

Accordingly, in some examples, it may be advantageous to dynamically fill the interior of a shell occupancy grid (action 408) by, for example, filling an enclosed volume of the occupancy grid with occupancy data indicating that each cell is occupied when the virtual object boundary 404 is enclosed by the shell occupancy grid, as shown in FIG. 4. In some examples, a fill algorithm may take the highest occupied cell (e.g., along a vertical axis) of the occupancy grid that is occupied and fill each cell below that cell to the bottom of the occupancy grid. In other examples, shape analysis may be used to find encompassing volumes within the occupancy grid (using the occupancy data to determine encompassing volumes). In various examples, segmentation techniques may be used to segment the point cloud data and/or the occupancy data into distinct objects. Thereafter, the filling algorithm may be independently run for each segmented object to fill the interior volume determined for that object. Thereafter, the intersection between the virtual object boundary and the filled-in occupancy grid may be determined in order to determine whether to disable/re-enable occlusion. It should be noted that other techniques besides object segmentation may be used to dynamically fill objects in the occupancy grid. For example, a starting point that is determined to be an interior of an object may be used and the occupancy grid may be traversed along a dimension (e.g., horizontally) while filling each cell of the occupancy grid. If a boundary of the occupancy grid is reached without encountering any filled occupancy cells, the dynamically filled cells in the horizontal traversal may be unfilled, as only empty space may have been encountered. Conversely, if a filled occupancy cell is encountered during the horizontal traversal, the boundary of the physical object may have been reached and the dynamic filling of the previously-traversed cells may be maintained.

Figure 5:
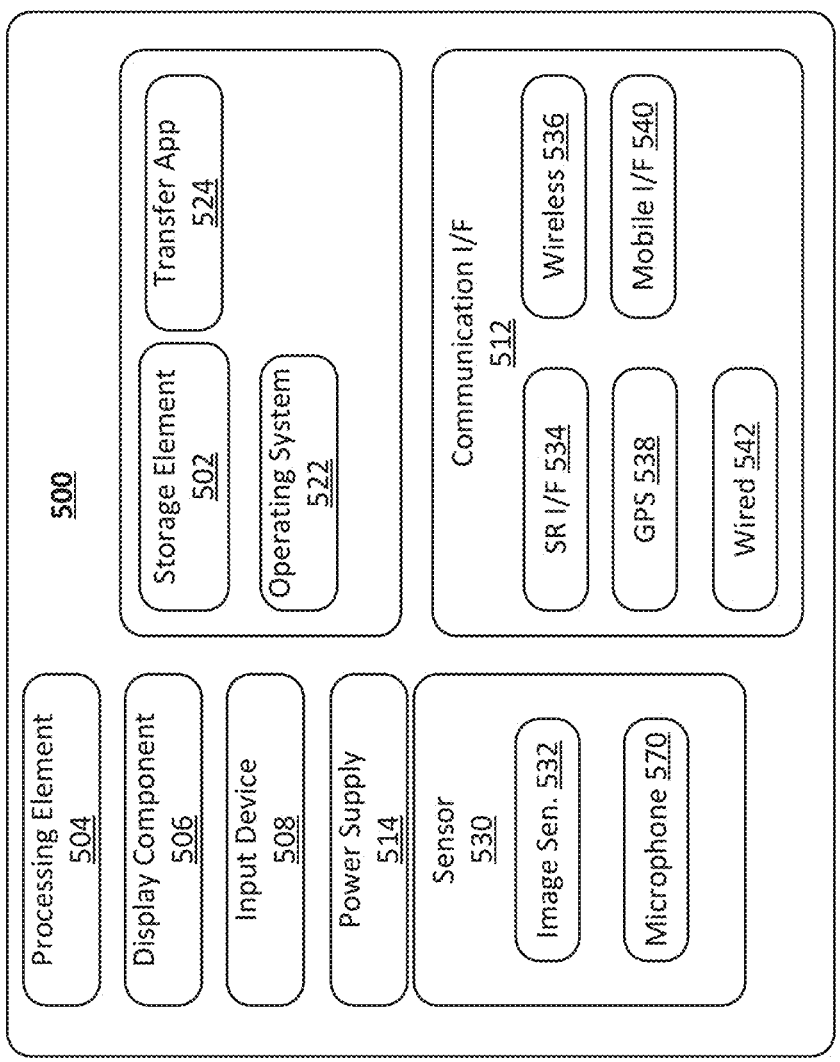
FIG. 5 is a block diagrams showing an example architecture of a computing device that may be used in accordance with various embodiments described herein.

FIG. 5 is a block diagram showing an example architecture 500 of a computing device that may be used for the various augmented reality techniques described herein, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store parameters, and/or machine learning models generated using the various techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display input images and/or 3D room models generated in accordance with the various techniques described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, depth sensors (e.g., a Lidar sensor), and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing device(s) 120, as described herein, are exemplary, and may be located as a stand-alone device or may be included, in whole or in part, as a component of a larger device or system.

Figure 6:
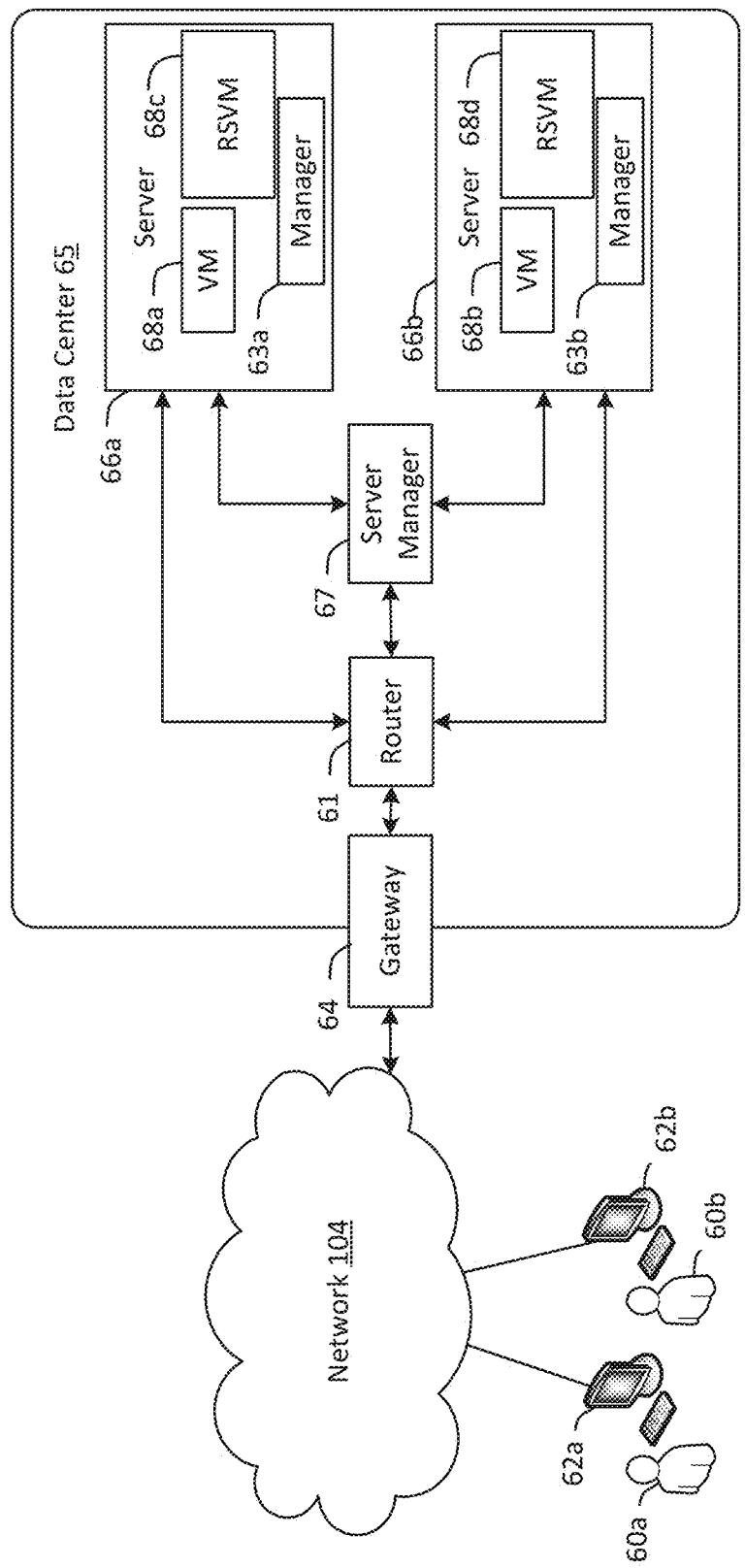
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. For example, the computing environment of FIG. 6 may be used to provide dynamic occlusion for augmented reality interfaces as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and nonvolatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various dynamic occlusion techniques described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources-consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution systems (such as application server instances, Java™ virtual machines (JVMs), general-purpose or special-purpose operating systems that support various interpreted or compiled programming languages such as Ruby, Perl, Python, C, C++ and the like or high-performance computing systems) suitable for the applications, without, for example, requiring the client to access an instance or an execution system directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware system, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 7:
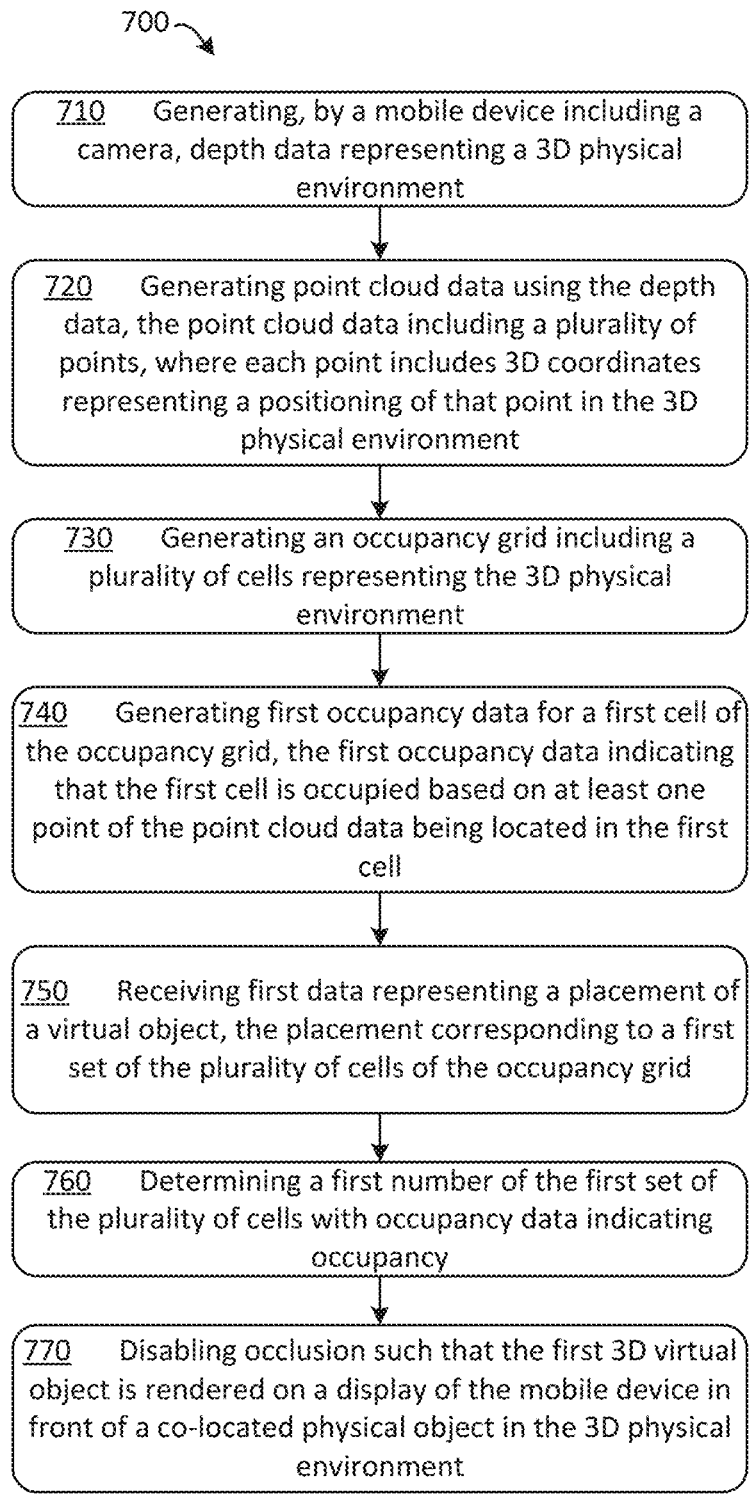
FIG. 7 is a flow chart depicting an example process for dynamic occlusion in an augmented reality interface, in accordance with various aspects of the present disclosure.

FIG. 7 is a flow chart depicting an example process 700 for dynamic occlusion in an augmented reality interface, in accordance with various aspects of the present disclosure. Those portions of FIG. 7 that have been previously discussed in reference to FIGS. 1-6 may not be described again for purposes of clarity and brevity. The actions of the process 700 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 700 of FIG. 7 may begin at action 710, at which a mobile device (e.g., an augmented reality device) that includes a camera may generate depth data representing a 3D physical environment. For example, a user of the mobile device may scan a room or other physical environment using one or more cameras of the mobile device to capture images of the room. The images may be associated with metadata indicating a relative position of the camera so that a 3D environment (e.g., a 3D model of the room) may be reconstructed from the images captured by the camera(s). In various examples, pixels of the image data may include depth values (e.g., Z values) indicating a distance between the camera lens and the surface represented by the pixel.

Processing may continue at action 720, at which point cloud data may be generated using the depth data. In various examples, various techniques known to those of ordinary skill in the art may be used to generate 3D Cartesian coordinates for each pixel that includes depth data. As a result, a point cloud comprising a variety of points may be generated, where each points is associated with 3D Cartesian coordinates (e.g., (X, Y, Z) coordinates). A 3D coordinate for a given point represents a position of that point in a 3D environment that represents the 3D physical environment.

Processing may continue at action 730, at which an occupancy grid may be generated. The occupancy grid may include a plurality of cells the represent the physical environment. If there is at least one point from the point cloud that is at a location corresponding to a given cell, occupancy data may be generated for that cell indicating that the cell is occupied (e.g., that there is at least a portion of at least one object in the physical environment at a location corresponding to the cell). Points from the point cloud that are determined to be structural points (e.g., part of a structural surface such as a wall, ceiling, floor, support beam, etc.) may be disregarded when generating the occupancy grid. The occupancy grid may be a conceptual 3D arrangement of evenly-spaced (or irregularly spaced, depending on the desired implementation) cells representing the physical environment.

Processing may continue at action 740, at which first occupancy data may be generated for a first cell of the occupancy grid. The first occupancy data may indicate that the first cell is occupied based on at least one point of the point cloud (e.g., at least one non-structural point) being located in the first cell. As previously described, points of the point cloud that are within a threshold distance of a plane that has been classified by image processing of the mobile device as a structural plane (e.g., a wall plane, floor plane, ceiling plane, etc.) may be designated as structural points. Points that are above a threshold distance of a structural plane may be deemed non-structural and may be used to populate the occupancy grid. Plane data may be refined as more and more images are captured of a physical environment. Accordingly, the occupancy grid may be refined as the user scans the environment.

Processing may continue at action 750, at which first data representing a placement of a virtual object may be received. The placement of the virtual object may correspond to a first set of the plurality of cells of the occupancy grid. For example, as the occupancy grid represents the augmented reality space and the user places a virtual object in the augmented reality space, there is an intersection between the location of the virtual reality object and cells of the occupancy grid. Accordingly, the first set of cells at action 750 represents the intersection between the virtual object (e.g., the virtual object boundary 306 at its current position) and the occupancy grid (e.g., occupancy grid 302).

Processing may continue at action 760, at which a first number of the first set of the plurality of cells with occupancy data indicating occupancy may be determined. For example, the number of occupied cells from among the total number of cells of the intersection between the virtual object and the occupancy grid may be determined. In the 2D example depicted in FIG. 3A, there are seven occupied cells in the intersection between the virtual object boundary 306 and the occupancy grid 302 among 30 total cells in the intersection.

Processing may continue at action 770, at which occlusion may be disabled such that the first 3D virtual object is rendered on a display of the mobile device in front of a co-located physical object in the 3D physical environment. For example, as shown in example image 134 of FIG. 1, since the degree of overlap between the virtual chair and the physical couch exceeds a relevant threshold (as determined based on the number of occupied cells in the intersection between the virtual object and the occupancy grid), occlusion may be disabled. Accordingly, the virtual chair is rendered as being in front of the physical couch. It should be noted that the first number of the first set of the plurality of cells may be used with or without flattening the occupancy grid (e.g., as described above in reference to FIGS. 3B, 3C) and with or without filling shell objects in the occupancy grid (e.g., as described above in reference to FIG. 4).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
   generating, by a mobile device comprising a camera, depth data representing a three dimensional (3D) physical environment;
   generating point cloud data using the depth data, the point cloud data comprising a plurality of points, where each point of the plurality of points comprises three dimensional coordinates representing a position of that point in the 3D physical environment;
   generating an occupancy grid comprising a plurality of cells representing the 3D physical environment;
   generating first occupancy data for a first cell of the occupancy grid, the first occupancy data indicating that the first cell is occupied based on at least one point of the point cloud data being present in the first cell;
   generating second occupancy data for a second cell of the occupancy grid, the second occupancy data indicating that the second cell is unoccupied based on the second cell being devoid of points from the point cloud data;
   receiving first data representing a placement of a first 3D virtual object, the placement of the first 3D virtual object corresponding to a first set of 3D coordinates in the occupancy grid;
   determining a first number of cells of the occupancy grid associated with the first set of 3D coordinates;
   determining a first percentage of the first number of cells associated with occupancy data indicating occupancy;
   determining that the first percentage is above a threshold percentage; and
   disabling occlusion such that the first 3D virtual object appears in front of a co-located physical object in the 3D physical environment when rendered on a display.

2. The method of claim 1, further comprising:
   generating, by the mobile device, plane data representing at least a first plane of the 3D physical environment, wherein the first plane is a floor plane;
   determining, for a first point of the point cloud, that the first plane is a nearest plane to the first point;
   determining that a first distance between the first plane and the first point is above a threshold distance, wherein the generating the occupancy grid comprises generating third occupancy data indicating that a third cell of the occupancy grid associated with the first point is occupied;
   determining, for a second point of the point cloud, that the first plane is the nearest plane to the second point; and
   determining that a second distance between the first plane and the second point is less than the threshold distance, wherein the second point is disregarded during the generating of the occupancy grid.

3. The method of claim 1, further comprising:
determining that the first cell of the occupancy grid is a highest occupied cell in the occupancy grid for a first column of cells; and
generating respective occupancy data for third cells below the first cell in the first column indicating that the third cells are occupied.

4. The method of claim 1, further comprising:
determining, using the first set of 3D coordinates, a volume in the occupancy grid associated with the first set of 3D coordinates, the volume comprising a plurality of columns of cells in the occupancy grid;
determining, for a first column of the plurality of columns using occupancy data for cells of the first column, that no cells of the first column are occupied;
determining, for a second column of the plurality of columns using occupancy data for cells of the second column, that at least one cell of the second column is occupied; and
generating horizontal occupancy data, wherein a third cell of the horizontal occupancy data that corresponds to the first column comprises second data indicating that the third cell is unoccupied and wherein a fourth cell of the horizontal occupancy data that corresponds to the second column comprises second data indicating that the fourth cell is occupied; and
wherein the determining the first percentage of the first number of cells associated with occupancy data indicating occupancy comprises determining the first percentage of occupied cells of the horizontal occupancy data.

5. A method comprising:
generating, by a mobile device comprising a camera, depth data representing a three dimensional (3D) physical environment;
generating point cloud data using the depth data, the point cloud data comprising a plurality of points, where each point of the plurality of points comprises three dimensional coordinates representing a position of that point in the 3D physical environment;
generating an occupancy grid comprising a plurality of cells representing the 3D physical environment;
generating first occupancy data for a first cell of the occupancy grid, the first occupancy data indicating that the first cell is occupied based on at least one point of the point cloud data being present in the first cell;
receiving first data representing a placement of a first 3D virtual object, the placement of the first 3D virtual object corresponding to a first set of the plurality of cells of the occupancy grid;
determining a first number of the first set of the plurality of cells with occupancy data indicating occupancy; and
disabling occlusion such that the first 3D virtual object is rendered on a display of the mobile device in front of a co-located physical object.

6. The method of claim 5, further comprising determining a degree of overlap between the first 3D virtual object and at least one object in the 3D physical environment, wherein the degree of overlap is determined based at least in part on the first number, wherein the occlusion is disabled based at least in part on the degree of overlap.

7. The method of claim 6, wherein the occupancy grid comprises a 3D configuration of cells comprising an x, y, and z dimension, further comprising:
generating horizontal occupancy data comprising a representation of an intersection between the first 3D virtual object and the occupancy grid, wherein the horizontal occupancy data comprises a layer of cells is in the x, z plane, and wherein a respective cell of the horizontal occupancy data is occupied when at least one cell having a same x, z coordinate as the respective cell in the occupancy grid is occupied.

8. The method of claim 7, wherein the degree of overlap is determined based at least in part on the first number of the first set of the plurality of cells in the horizontal occupancy data exceeding a threshold.

9. The method of claim 5, further comprising:
determining, for a first column of cells of the occupancy grid, a highest cell with occupancy data indicating that the highest cell is occupied; and
generating occupancy data for a plurality of cells below the highest cell in the first column of cells indicating that the plurality of cells are occupied.

10. The method of claim 5, further comprising:
generating, by the mobile device, plane data representing at least a first plane of the 3D physical environment;
determining, for a first point of the point cloud data, that the first plane is a nearest plane to the first point;
determining that a distance between the first point and the first plane exceeds a threshold distance; and
disregarding the first point when generating the occupancy grid.

11. The method of claim 5, further comprising:
determining a shell of a first object represented in the occupancy grid, the shell defining at least part of an outer boundary of the first object in the occupancy grid;
determining that the placement of the first 3D virtual object is located within an interior of the shell; and
generating occupancy data for cells of the interior of the shell indicating that the cells of the interior are occupied based at least in part on the placement of the first 3D virtual object being located within the interior of the shell.

12. The method of claim 5, further comprising:
determining that the first number is above a first threshold number;
disabling the occlusion based at least in part on the first number being above the first threshold number;
receiving second data representing a second placement of the first 3D virtual object, the second placement corresponding to a second set of the plurality of cells of the occupancy grid;
determining a second number of the second set of the plurality of cells with occupancy data indicating occupancy;
determining that the second number is below the first threshold number and above a second threshold number; and
rendering the first 3D virtual object on the display in front of any physicals objects in the 3D physical environment.

13. The method of claim 5, further comprising:
determining a first point of the plurality of points that is designated as a structural point;
storing a designation of the first point as a structural point in memory;
determining, by the mobile device, updated plane data; and
changing the designation of the first point from the structural point to a non-structural point based at least in part on the updated plane data.

14. A system comprising:

at least one processor;

a display; and non-transitory computer-readable memory storing instructions that, when executed by the at least one processor, are effective to:

generate depth data representing a three dimensional (3D) physical environment;

generate point cloud data using the depth data, the point cloud data comprising a plurality of points, where each point of the plurality of points comprises three dimensional coordinates representing a position of that point in the 3D physical environment;

generate an occupancy grid comprising a plurality of cells representing the 3D physical environment;

generate first occupancy data for a first cell of the occupancy grid, the first occupancy data indicating that the first cell is occupied based on at least one point of the point cloud data being present in the first cell;

receive first data representing a placement of a first 3D virtual object, the placement of the first 3D virtual object corresponding to a first set of the plurality of cells of the occupancy grid;

determine a first number of the first set of the plurality of cells with occupancy data indicating occupancy; and disable occlusion such that the first 3D virtual object is rendered on a display in front of a co-located physical object.

15. The system of claim 14, the non-transitory computer-readable memory storing further instructions that, when executed by the at least one processor, are further effective to:

determine a degree of overlap between the first 3D virtual object and at least one object in the 3D physical environment, wherein the degree of overlap is determined based at least in part on the first number, wherein the occlusion is disabled based at least in part on the degree of overlap.

16. The system of claim 15, wherein the occupancy grid comprises a 3D configuration of cells comprising an x, y, and z dimension, and wherein the non-transitory computer-readable memory stores further instructions that, when executed by the at least one processor, are further effective to:

generate horizontal occupancy data comprising a representation of an intersection between the first 3D virtual object and the occupancy grid, wherein the horizontal occupancy data comprises a layer of cells is in the x, z plane, and wherein a respective cell of the horizontal occupancy data is occupied when at least one cell having a same x, z coordinate as the respective cell in the occupancy grid is occupied.

17. The system of claim 16, wherein the degree of overlap is determined based at least in part on the first number of the first set of the plurality of cells in the horizontal occupancy data exceeding a threshold.

18. The system of claim 14, the non-transitory computer-readable memory storing further instructions that, when executed by the at least one processor, are further effective to:

determine, for a first column of cells of the occupancy grid, a highest cell with occupancy data indicating that the highest cell is occupied; and generate occupancy data for a plurality of cells below the highest cell in the first column of cells indicating that the plurality of cells are occupied.

19. The system of claim 14, the non-transitory computer-readable memory storing further instructions that, when executed by the at least one processor, are further effective to:

generate plane data representing at least a first plane of the 3D physical environment;

determine, for a first point of the point cloud data, that the first plane is a nearest plane to the first point;

determine that a distance between the first point and the first plane exceeds a threshold distance; and disregard the first point when generating the occupancy grid.

20. The system of claim 14, the non-transitory computer-readable memory storing further instructions that, when executed by the at least one processor, are further effective to:

determine a shell of a first object represented in the occupancy grid, the shell defining at least part of an outer boundary of the first object in the occupancy grid;

determine that the placement of the first 3D virtual object is located within an interior of the shell; and generate occupancy data for cells of the interior of the shell indicating that the cells of the interior are occupied based at least in part on the placement of the first 3D virtual object being located within the interior of the shell.

* * * * *